United States Patent [19]

Kuroda

[11] 4,342,351

[45] Aug. 3, 1982

[54] PNEUMATIC TIRE FOR HIGH SPEED UNDER HEAVY LOAD

[75] Inventor: Masahiro Kuroda, Higashi-Murayama, Japan

[73] Assignee: Bridgestone Tire Co., Ltd., Tokyo, Japan

[21] Appl. No.: 142,956

[22] Filed: Apr. 23, 1980

Related U.S. Application Data

[63] Continuation of Ser. No. 897,814, Apr. 19, 1978, abandoned.

[30] Foreign Application Priority Data

Apr. 28, 1977 [JP] Japan .................................. 52/48492

[51] Int. Cl.$^3$ .......................... B60C 3/00; B60C 9/06; B60C 9/20
[52] U.S. Cl. .......................... 152/209 R; 152/352 R; 152/354 R; 152/361 R; 152/362 R
[58] Field of Search .............. 152/209, 362 R, 354 R, 152/354 RB, 355, 356, 352–353, 361 R, 361 FP, 361 DM

[56] References Cited

U.S. PATENT DOCUMENTS

| | | | |
|---|---|---|---|
| 1,165,630 | 12/1915 | Seward | 152/354 |
| 2,155,972 | 4/1939 | Hower | 152/353 R |
| 2,348,350 | 5/1944 | McKelvey | 152/361 R |
| 3,685,564 | 8/1972 | Smithkey, Jr. | 152/361 R |
| 3,780,782 | 12/1973 | Jennings et al. | 152/356 |
| 4,142,568 | 3/1979 | Kleijwegt | 152/354 R |

FOREIGN PATENT DOCUMENTS

| | | | |
|---|---|---|---|
| 1019576 | 11/1957 | Fed. Rep. of Germany | 152/354 |
| 1171420 | 1/1959 | France | 152/354 |
| 1273060 | 5/1972 | United Kingdom | 152/354 |

Primary Examiner—Edward C. Kimlin
Assistant Examiner—Lois E. Boland
Attorney, Agent, or Firm—Sughrue, Mion, Zinn, Macpeak & Seas

[57] ABSTRACT

A pneumatic tire for a high speed under a heavy load is disclosed. In order to effectively refrain a crown radius of curvature of the tire from decreasing due to a centrifugal force, the tire is constructed as follows. The tire comprises a case reinforcing layer composed of a plurality of carcass plies mainly formed of organic textile cords inclined at an angle of at most 45° to the circumferential direction of the tire and a plurality of reinforcing fabrics whose material and inclined angle to the circumferential direction of the tire are substantially the same as those of the cords of the carcass ply and interposed between the carcass plies. The plurality of reinforcing fabrics extend from those positions which are distant apart from one of bead portions through a tire crown portion and terminating at those positions which are distant apart from the other bead portion. The number of the reinforcing fabrics is at least 20% of the total number of both the carcass plies and the reinforcing fabrics. The total number of the case reinforcing layers is divided into two halves and one of the two halves cross the other halves. The reinforcing fabrics are gradually changing in width within a range between 35% and 60% of the inner peripheral length of the tire and symmetrically arranged with respect to a crown center portion.

8 Claims, 7 Drawing Figures

PNEUMATIC TIRE FOR HIGH SPEED UNDER HEAVY LOAD

This is a continuation of application Ser. No. 897,814, filed Apr. 19, 1978, now abandoned.

BACKGROUND OF THE INVENTION (1) Field of the Invention

This invention relates to a pneumatic tire for a high speed under a heavy load.

(2) Description of the Prior Art

Here, the wording "for a high speed under a heavy load" shall be understood to mean uses in which at least one of conditions that the load subjected to the tire is remarkably high and that a centrifugal force acting on the ground contact zone of the tire when the tire rotates at a high speed becomes significantly large must be taken into consideration. In a concrete example of such uses, the tire is used under especially severe conditions as in the case of an airplane or similar high speed transport means subjected to a heavy load and it raises a problem whether or not the tire is suitable for such a severe condition.

The tire according to the invention is used under considerably severe conditions which must satisfy at least one of both a wheel weight load in which a value L obtained by dividing the load subjected to the tire by the tire volume is larger than 0.04 and a centrifugal load in which a value H given by $v^2/g \cdot r$ were v is a peripheral speed of the tire surface, r is a rotary radius of the tire and g is an acceleration gravity of the tire is larger than 4000.

Figure 1:
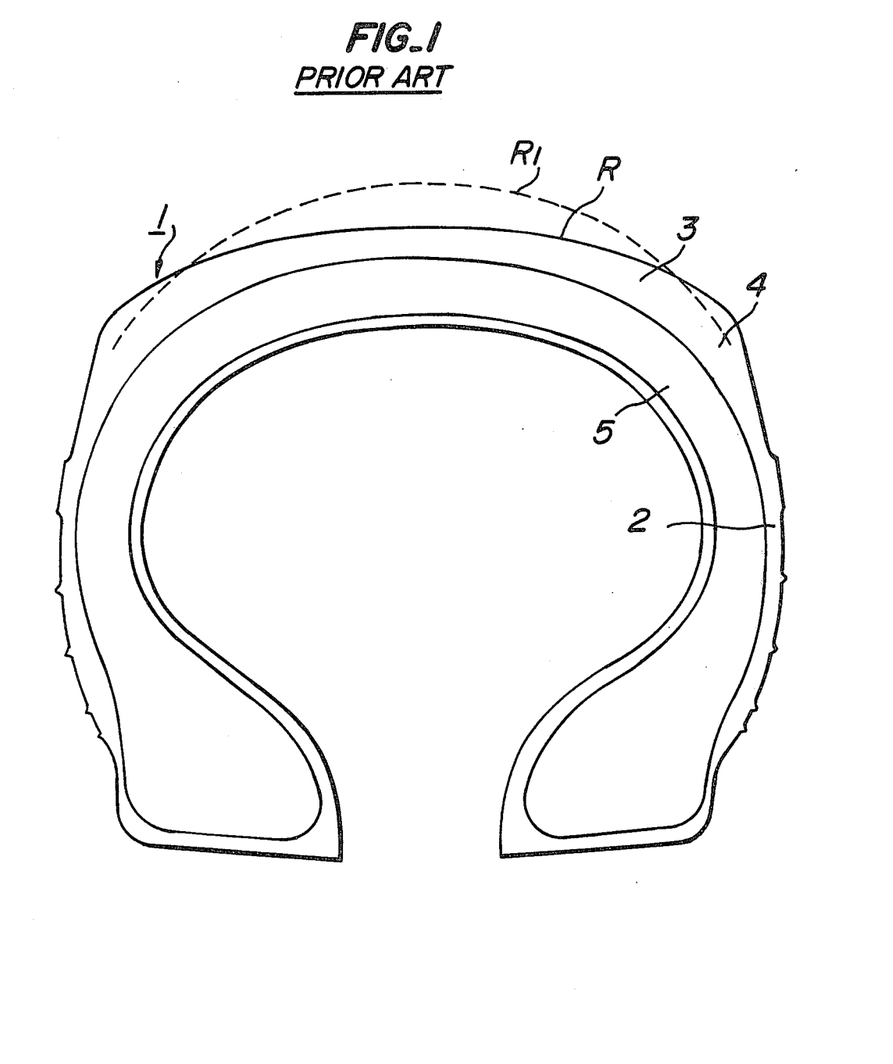
FIG. 1 is a radial sectional view containing the axis of a conventional tire used under an extra heavy load.

In FIG. 1 is shown a typical conventional tire used under the above mentioned conditions. As shown in FIG. 1, a tire 1 comprises a side wall portion 2, a tread portion 3, a hump portion 4 having a particularly large thickness, and a case reinforcing ply 5. The entire case reinforcing ply 5 is extended from one of bead cores to the other bead core. If necessary, the case reinforcing ply 5 may be provided at its outermost layer with a breaker for the purpose of improving a cut resistant property of the tire.

In the conventional tire shown in FIG. 1, the case reinforcing ply 5 is composed of plies which are substantially the same in number from the center of the tread portion 3 through the hump portion 4 to the side wall portion 2 and which are uniform in thickness distribution. This thickness distribution is substantially the same even when the case reinforcing ply 5 is provided at its outermost layer with the breaker.

In the case of deriving the thickness distribution by calculation, a cap ply and those plies which are arranged along the bottom of tread grooves are excluded from the calculation.

If the conventional tire constructed as above described is used for high speed under a heavy load as in the present invention, this involves the following problems.

a. Considerably large wheel weight load acting on the tire.

In the conventional tire design, it has been the common practice to increase the amount of air to be fed into the tire, that is, to increase the internal pressure to be fed into the tire or to increase the tire size for the purpose of compensating the considerable increase of the wheel weight acting on the tire. In order to increase the internal pressure to be fed into the tire, if the number of plies of the case reinforcing ply is increased to increase its strength, this strength is determined by the strength at the center of the tread portion 3. As a result, the strength at the hump portion 4 and side wall portion 3 becomes unnecessarily large and hence the weight of the tire is increased and much heat is generated in the tire or the tire becomes expensive. The most simple way of eliminating such problem is to enlarge the tire size. But, this takes up much space and represents a material increase in cost.

b. High speed rotation of the tire.

The conventional tire shown in FIG. 1 is suitable for a simple high speed running. But, if the increased wheel weight load is added to such simple high speed running, a separation failure is induced between the coating rubber of the tread portion 3 on the one hand and the outermost layer or eventually the ply of the case reinforcing ply 5 on the other hand. Most of the separation failure extends circumferentially at substantially the center of the tread portion 3 of the tire. In addition, eccentric wear results in a difference in the ground contact pressure distribution and in a decrease of the ground contact area. In this case, when the tire rotates at a high speed, the mode of the crown portion of the tire becomes different from that of the tire used in general. A considerably large centrifugal force overcomes the tension and rigidity of the case reinforcing ply 5, so that the center of the tread portion 3 is deformed so that the center is projected outwardly in the radial direction of the tire as shown by dotted lines in FIG. 1. That is, the crown radius of curvature is decreased from R to $R_1$ and this together with difference between the deformation at the ground contact area directly below the load and the deformation at the non-ground contact area released from the wheel weight load function to produce a standing wave, that is, undulating deformation phenomenon due to the fact that within a time that the ground contact deformation of the tire is not yet restored to its original shape the next ground contact deformation is superimposed thereon. In order to prevent such undulating deformation phenomenon, the above mentioned change of the crown radius from R to $R_1$ should be restrained.

As seen from the above, an improved tire adapted to be used for a high speed under a heavy load without increasing the tire size or without increasing the internal pressure of the tire is now urgently in demand.

SUMMARY OF THE INVENTION

An object of the invention, therefore, is to provide a pneumatic tire for a high speed under a heavy load, which can suitably be used under the above mentioned conditions and which has an improved case and tread construction.

A feature of the invention is the provision of a pneumatic tire for a high speed under a heavy load comprising a case or casing reinforcing layer composed of a plurality of carcass plies mainly formed of organic textile cords inclined at an angle of at most 45° to the circumferential direction of the tire, said carcass plies extending from one of bead portions through a crown portion of the tire to the other bead portion and superimposed one upon the other. Also, a plurality of reinforcing fabrics whose material and inclined angle to the circumferential direction of the tire are substantially the same as those of said cords of the carcass ply are interposed between carcass plies. The plurality of reinforcing fabrics extending from those positions which are distant apart from one of the bead portions through the tire crown portion terminate at those positions which are distant apart from the other bead portion, the number of said reinforcing fabrics being at least 20% of the total number of both said carcass plies and said reinforcing fabrics of said case reinforcing layer. The total number of the case reinforcing layer is divided into two halves and one of said two halves crosses the other half, said reinforcing fabrics gradually changing in width within a range between 35% and 60% of the inner peripheral length of the tire and symmetrically arranged with respect to a crown center portion. The superimposed thickness of said case reinforcing layer is smoothly and continuously decreased such that the thickness at a hump portion is within a range between 85% and 95% of the thickness at the crown center portion thereof and the thickness at a side wall portion is within a range between 50% and 75% of the thickness at the crown center portion thereof. The thickness of a tread coating rubber surrounding said case reinforcing layer is gradually increased from the crown center portion toward the hump portions such that the thickness at the crown center portion is 10 to 28% of the total thickness of the crown center portion and is at most 1.5% of the maximum outer diameter of the tire when it is inflated. The tire has a high rigidity as defined by the cross-sectional area ratios given by $V_2/V_1 = 0.45$ to $0.60$ and $V_3/V_2 = 0.6$ to $0.8$ where $V_1$ is a total cross-sectional area of the tire surrounded by the outer contour of the tire and a flat base rim, $V_2$ is a substantial cross-sectional area of the tire surrounded by the outer and inner contours of the tire and $V_3$ is a cross-sectional area of said case reinforcing layer inclusive of bead cores. Hence, a decrease of the radius of curvature at the crown portion induced when the tire is rotated on the ground at a high speed under a heavy load is substantially alleviated by a deformation of said side wall portion.

As seen from the above, the invention specifically defines the construction of the case reinforcing layer, thickness distribution of both the case reinforcing layer and the tread coating rubber, a ratio of the substantial cross-sectional area of the tire surrounded by the outer and inner contours of the tire to the total cross-sectional area of the tire surrounded by the outer contour of the tire and the flat base rim and a ratio of the cross-sectional area of the case reinforcing layer inclusive of the bead cores to the above mentioned substantial cross-sectional area of the tire surrounded by the outer and inner contours of the tire.

The decrease of the crown radius of the tire induced when the tire is rotated at a high speed exerts various kinds of influences upon the tire performance. The use of the above mentioned measure, however, can effectively refrain the crown radius of curvature from decreasing and provides the important advantage that it is possible to effectively improve the load-bearing-ability of the tire for high speed under a heavy load.

DESCRIPTION OF THE PREFERRED EMBODIMENT

The invention will now be described with reference to its progress of development.

In order to cause a tire for a high speed under a heavy load used under the above mentioned condition to effectively satisfy the above mentioned requirements, first, it is necessary to make the rigidity of the tire sufficiently high. For this purpose, various experimental tests have repeatedly been carried out. These experimental tests have yielded the result that ratios among the cross-sectional areas of various parts on the equatorial plane of the tire must be defined as follows.

Figure 2:
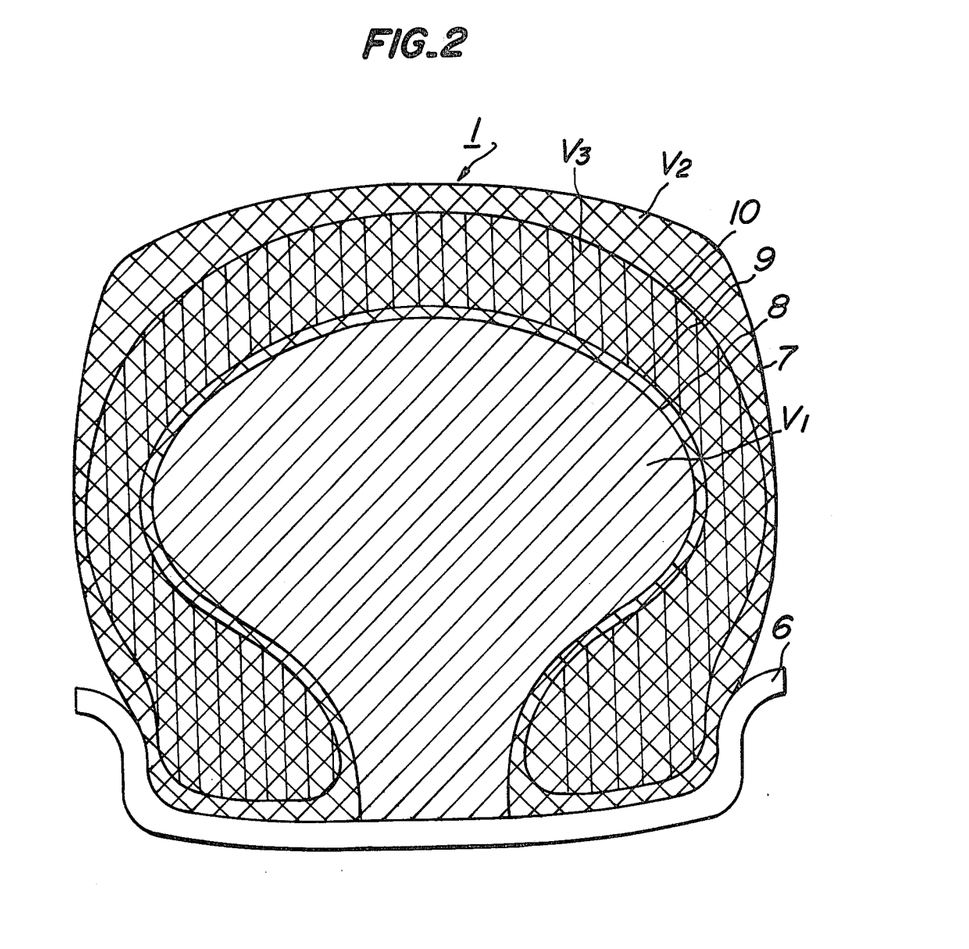
FIG. 2 is a radial sectional view containing the axis of a tire built in accordance with the invention and illustrating essential parts thereof.

In FIG. 2, $V_1$ designates an apparent total cross-sectional area of a tire 1 united with a flat base rim 6, that is, an area surrounded by an outer contour 7 of the tire 1 and by the flat base rim 6 and shown by a region represented by oblique lines extending from the right above toward the left bottom of the tire. $V_2$ is a substantial cross-sectional area of the tire surrounded by an inner contour 8 and the outer contour 7, that is, an area shown by a region represented by oblique lines extending from the left above toward the right bottom of the tire. $V_3$ is an area included in this substantial cross-sectional area $V_2$ and surrounded by an inner contour 9 and an outer contour 10 of the case reinforcing layer and inclusive of the bead cores and stiffeners, that is, an area shown by a region represented by parallel vertical lines. In accordance with the invention, ratios of $V_2$ to $V_1$ and of $V_3$ to $V_2$ are given by (1) $V_2/V_1 = 0.45$ to $0.60$, preferably $0.48$ to $0.57$ and
(2) $V_3/V_2 = 0.60$ to $0.80$, preferably $0.65$ to $0.75$.

If $V_2/V_1$ is smaller than 0.45, the rigidity required for the tire in use could not be obtained and there is a risk of the standing wave being produced.

On the contrary, if $V_2/V_1$ exceeds 0.60, generation of heat in the tire becomes accelerated and the weight of the tire becomes excessively large and hence the tire could not be used in practice.

If $V_3/V_2$ is smaller than 0.6, the rigidity required for the tire in use could not also be obtained. On the contary, if $V_3/V_2$ exceeds 0.8, it is impossible to obtain that thickness of the tread coating rubber, which is required for protection of the case reinforcing layer, particularly required for resistance to wear, thereby making the life of tire short.

As seen from the above, the tire according to the invention must satisfy the above mentioned requirements for the cross-sectional area ratios.

As to the case reinforcing layer, the above mentioned problem which has been encountered with the use of the case reinforcing ply shown in FIG. 1 and extending from one of the bead cores to the other bead core and wrapping around the bead cores can effectively be eliminated by a composite construction composed of a carcass ply extending from one of bead cores to the other bead core. A reinforcing fabric is interposed between the carcass plies and extending from those positions which are distant apart from one of bead cores through a tire crown portion and terminating at those positions which are far distant apart from the other bead core.

The particulars of the composite construction composed of the carcass ply and the reinforcing fabric are as follows.

1. The carcass ply is mainly composed of organic textile cords and extends from one of bead cores through the tire crown portion to the other bead core. The carcass ply is composed of a plurality of plies superimposed one upon the other.

2. The reinforcing fabric interposed between the carcass plies is formed of material which is substantially the same as that of the carcass ply and composed of a plurality of fabrics and extending from those positions which are distant apart from one of the bead cores through the tire crown portion and terminating at these positions which are distant apart from the other bead core.

3. Both the carcass ply and the reinforcing fabric are inclined at an angle within a range of at most 45° to the circumferential direction at the tire crown center portion.

4. The number of the reinforcing fabrics is made at least 20%, preferably 25% to 40% of the total number of the case reinforcing layer composed of the carcass ply and the reinforcing fabric.

5. The total number of the case reinforcing layers is divided into two halves and one of the two halves cross the other half. It is preferable that the carcass ply adjacent to the reinforcing fabric cross the latter.

6. The width of the reinforcing fabrics is gradually changed within a range between 35% and 60%, preferably between 45% and 60% of the inner peripheral length of the tire. It is particularly preferable to make the width of the reinforcing fabric located near the tread coating rubber smaller than the width of the other reinforcing fabrics.

7. The thickness of the case reinforcing layer composed of the carcass ply and the reinforcing fabric is distributed as follows.

The thickness at the crown center portion $C_G$:
The thickness at the hump portion $H_G$:
The thickness at the side wall portion $S_G$
= 100:(85 to 95):(50 to 75), preferably
100:(88 to 93):(50 to 70)

Here, the term thickness shall be understood to include a coating rubber of each of the carcass ply and the reinforcing fabric, but exclude a special cap ply.

The thickness of the tread coating rubber surrounding the case reinforcing layer is distributed such that the thickness at the tire crown center portion is 10 to 28%, preferably 15 to 25% of the total thickness of the tire crown center portion, and at most 1.5% of the maximum outer diameter of the tire when it is inflated, that the thickness at the tire crown center portion is gradually increased from the crown center portion toward the hump portion to cause the tire outer surface to form a tread having a given crown radius.

The tire constructed as above described according to the invention provides the important advantage that even when the tire rotates at an extra high speed under an extra heavy load, the decrease of the crown radius of curvature is restrained mainly by the deformation due to elongation of the relatively soft side wall portion. Also, the tire has a significantly excellent load-bearing ability.

In accordance with the invention, both the carcass ply and the reinforcing fabric of the case reinforcing layer must be formed of the organic textile cords.

This is because of the fact that it is desirous to make the cords per se resilient for the purpose of causing the side wall portion to exhibit its deformation due to elongation.

In addition, such cords must be inclined at an angle of at most 45° to the circumferential direction of the tire. If the angle exceeds 45°, the rigidity of the tread center in the direction of the outer diameter of the tire becomes insufficient and hence the effect of restraining the growth of the crown center portion due to the centrifugal force could not be obtained.

The organic textile cord may be formed of rayon, nylon, polyester or the like. It is preferable to use the organic textile cord formed of nylon.

The reasons why the number of the reinforcing fabrics is limited to at least 20% of the total number of both the carcass plies and the reinforcing fabrics of the case reinforcing layer are that if the number of the reinforcing fabrics is smaller than 20% of the total number of the plies of the case reinforcing layer, it is difficult to distribute the thickness of the case reinforcing layer as is required.

In addition, the reasons why the width of the reinforcing fabric is limited to 35 to 60% of the inner peripheral length of the tire are as follows. If the width of the reinforcing fabric is narrower than 35% of the inner peripheral length of the tire, it is difficult to distribute the thickness of the case reinforcing layer as is required. On the contrary, if the width of the reinforcing fabric exceeds 60%, the rigidity of the side wall portion becomes excessively large.

As described above, the reinforcing construction and configuration of the case reinforcing ply 5 are most influential in the decrease of the crown radius of curvature at the tread surface from R to $R_1$ as shown in FIG. 1. In addition, such decrease of the crown radius of curvature results in a deterioration of the tire performance.

The invention is based on the recognition that the above mentioned drawback is caused by the centrifugal force acting concentrically on the crown center portion when the tire rotates at an extra high speed. In order to effectively eliminate this drawback, the invention specifically defines the thickness distribution of the case reinforcing ply in dependence with the weight and performance of the tire.

Heretofore, it has been the common practice to design the case reinforcing ply 5 such that the tread portion 3 is reinforced at its center only, so that the case reinforcing ply 5 extending from the tread center portion to the side wall portion is composed of substantially the same number of plies and hence is the same in thickness. As a result, the hump portion 4 and side wall portion 2 become sufficiently large in strength, and as a result, when the tire rotates at a high speed, the tread surface becomes projected as shown by dotted lines in FIG. 1, that is, the crown radius of curvature is decreased.

In the present invention, the thickness distribution of the case reinforcing ply is experimentally determined such that a local deformation at the center region of the tread portion 3 of the tire 1 is effectively avoided to permit the tread portion as a whole to increase its radius. As a result, it is discovered that such thickness distribution of the case reinforcing ply can preferentially expedite the deformation due to elongation of the side wall portion and hence can effectively prevent the center region of the tread portion from locally deforming due to the centrifugal force.

The thickness $C_G$ of the case reinforcing ply at the crown center portion should be 70 to 90%, preferably 75 to 85% of the total thickness G of the crown center portion of the tire. If the thickness $H_G$ of the hump portion is smaller than 85% of the thickness $C_G$ of the case reinforcing ply at the crown center portion, the hump portion becomes inferior in strength to the crown center portion, so that it is impossible to refrain the crown center portion from growing due to the centrifugal force.

On the contrary, if the thickness $H_G$ of the hump portion exceeds 95% of the thickness $C_G$ of the case reinforcing ply at the crown center portion, the strength of the hump portion becomes unnecessarily large, thereby providing the disadvantage that the tire tends to increase both the heat generation and the weight.

If the thickness $S_G$ of the side wall portion is smaller than 50% of the thickness $C_G$ of the case reinforcing ply at the crown center portion, the side wall portion becomes inferior in strength to the crown center portion. If the thickness $S_G$ of the side wall portion exceeds 75% of the thickness $C_G$ of the case reinforcing ply at the crown center portion, such increased thickness results in the disadvantage of increasing the heat generation and weight of the tire. In addition, it is impossible to expect the elongation effect of the side wall portion due to the centrifugal force, so that such increased thickness $S_G$ of the side wall portion is not suited for the object of the invention.

In the present invention, the thickness distribution of the tread coating rubber for surrounding the case reinforcing ply is determined such that the thickness l of the tread coating rubber at the crown center portion is 10 to 28% of the total thickness G of the crown portion for the purpose of obtaining resistance to wear and of preventing heat generation under a considerably heavy wheel weight load of L>0.04. It is at most 1.5% of the maximum outer diameter of the tire when it is inflated for the purpose of preventing the tread coating rubber from stripping off the case reinforcing layer under a considerably large centrigual force load of H>4,000. The thickness of the tread coating rubber thus determined is gradually increased from the crown center portion toward the hump portions so as to provide a given crown radius at the tread surface.

The invention will now be concretely described with reference to an embodiment.

Figure 3:
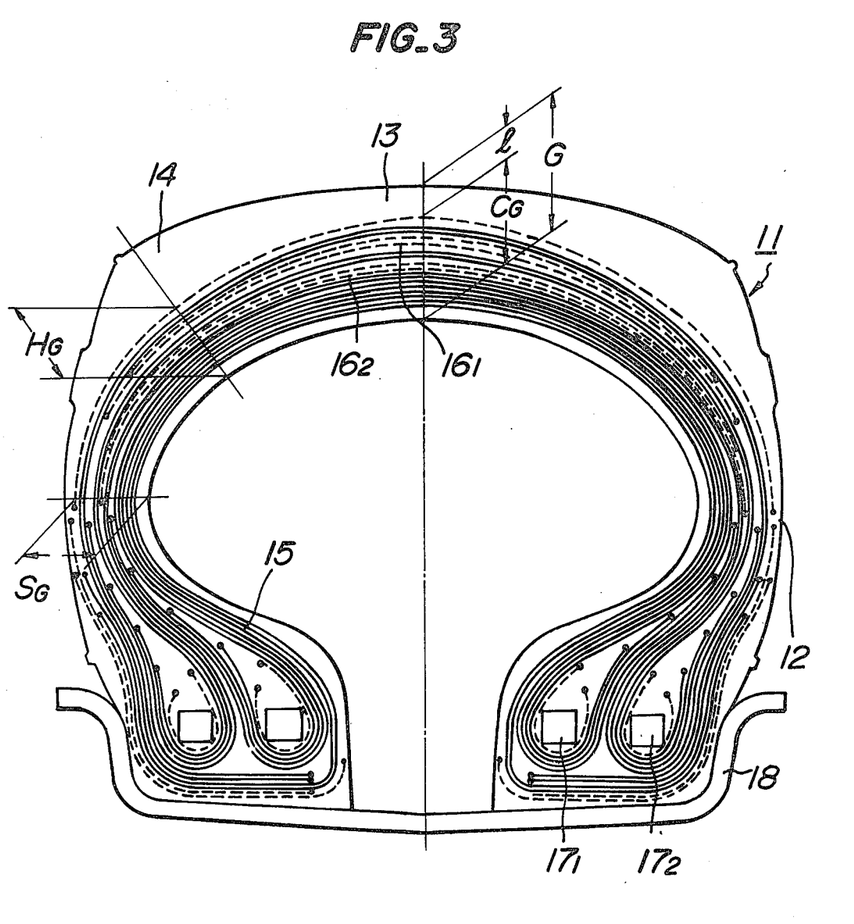
FIG. 3 is a radial sectional view containing the axis of one embodiment of a tire according to the invention.

In FIG. 3 is shown in cross-section through the equatorial plane of an embodiment of a tire according to the invention having a size of 25×6.75 18PR.

The tire shown in FIG. 3 has the following dimensions.

Maximum outer diameter of tire:

| 64 cm: | (under inflated condition by applying normal internal pressure of 21 kg/cm$^2$) |
| --- | --- |
| Width of tire: | 17 cm |
| Maximum load: | 3,000 kg |
| Maximum speed: | 500 km/h |
| Number of carcass plies: | 12 |
| Material of cord: | Nylon |
| Twisted construction of cord: | 840 d/2 |
| Inclined angle of cord: | 27° to the circumferential direction of the tire. |
| Number of cords per unit length: | Average 38/2.5 cm |
| Number of reinforcing fabrics interposed between adjacent carcass plies: | 4 (2 sets each composed of 2 fabrics) |

2 sets of reinforcing fabrics each composed of 2 fabrics comprise cords which are the same in material, twisted construction, inclined angle and number of cords per unit length as those of the carcass ply and which extend along two directions crossed with each other. One of these two sets of the reinforcing fabrics is inserted between a second ply and a third ply of the carcass ply and the other set is interposed between a fourth ply and a fifth ply of the carcass ply, the order of the carcass plies being counted from the tread side.

The width of the first to fourth reinforcing fabrics in the order counted from the tread side is given by

| The first fabric: | 145 mm |
| --- | --- |
| The second fabric: | 160 mm |
| The third fabric: | 175 mm |
| The fourth fabric: | 190 mm |

In FIG. 3, reference numeral 11 generally designates a tire, 12 a sidewall portion, 13 a crown portion and 14 a hump portion. Reference numeral 15 designate a carcass ply and $16_1$, $16_2$ reinforcing fabrics interposed between the carcass plies, respectively.

The carcass ply 15 is divided into two halves. One of the halves are wrapped around an inner bead core $17_1$ from the inside to the outside thereof in a conventional manner, while the other half is wrapped around an outer bead core $17_2$ from the inside to the outside thereof. Reference numeral 18 designates a flat base rim.

Figure 4:
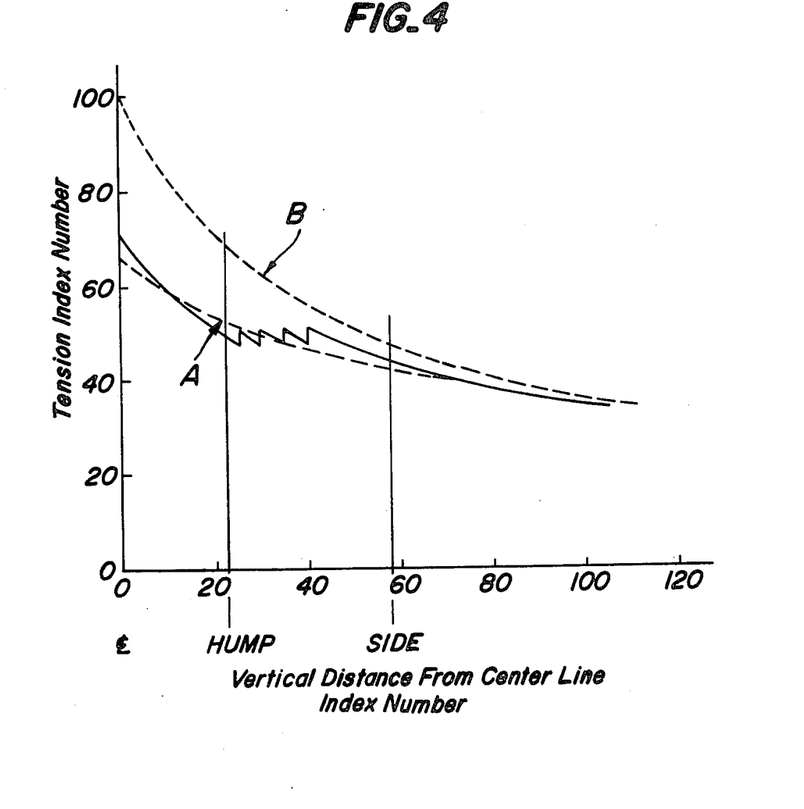
FIG. 4 is a graph showing a relation between a tension subjected to a case reinforcing layer and a vertial distance from the center line of a tire according to the invention as compared with the corresponding relation of a conventional tire.

FIG. 4 shows a graph of tension distribution from a crown center portion of a tire through its hump portion toward the corresponding side wall portion of the tire. In FIG. 4, a dashed line curve A shows the tension distribution of a tire according to the invention shown in FIG. 3, while a dashed line curve B shows the tension distribution of a conventional tire shown in FIG. 1 and having a size which is the same as that of the tire according to the invention. The tension produced at the crown center portion of the case reinforcing ply 5 of the conventional tire 1 shown in FIG. 1 when it is inflated by applying a normal internal pressure therein is designated by tension index of 100.

As seen from curve A in FIG. 4, the invention is capable of not only reducing the tension subjected to the center of the crown portion 13 to the order of several tens %, but also reducing the tension difference between the hump portion 14 and the side wall portion 12.

In the case reinforcing ply 5 of the conventional tire shown by the curve B, the tension difference between the maximum tension at the crown center portion and the tension at the side wall portion is considerably larger than the tension difference between the crown center portion and the hump portion. On the contrary, the invention is capable of gradually reducing the tension subjected to the case reinforcing layer 15 from its crown center portion through the hump portion 14 to the corresponding side wall portion 12 of the tire and of making the tension difference between the hump portion 14 and the corresponding side wall portion 12 smaller than that of the conventional tire.

That is, in the tire according to the invention shown by curve A, between the carcass plies extending from the crown portion 13 toward the hump portion 14 and one portion of the corresponding side wall portion are interposed the reinforcing fabrics $16_1$, $16_2$ which function to reinforce mainly the crown portion 13. The use of the measure described ensures an increase of the relative strength and rigidity of the crown portion 13 and provides the important advantage that the tension born by the crown portion 13 is reduced and any portions other than the crown portion 13 are decreased in rigidity due to the substantial decrease of the number of the reinforcing fabrics, whereby particularly the side wall portion 12 tends to be easily deformed.

In short, the tension distribution shown in FIG. 4 is dependent on the thickness distribution of the reinforcing fabrics $16_1$, $16_2$.

The effect desired by the tension distribution according to the invention can easily be obtained if the tension subjected to the carcass ply 15 at the side wall portion 12, particularly at the maximum width position of the tire when it is inflated is within a range on the order of 50 to 70% of the maximum tension subjected to the crown center portion.

If this tension value is smaller than 50%, it is impossible to avoid the decrease of the crown radius of curvature due to the centrifugal force. On the contrary, if this tension value exceeds 70%, heat is generated at the crown center portion and the side wall portion 12 is so excessively reinforced that the weight of the tire becomes increased.

Figure 5A:
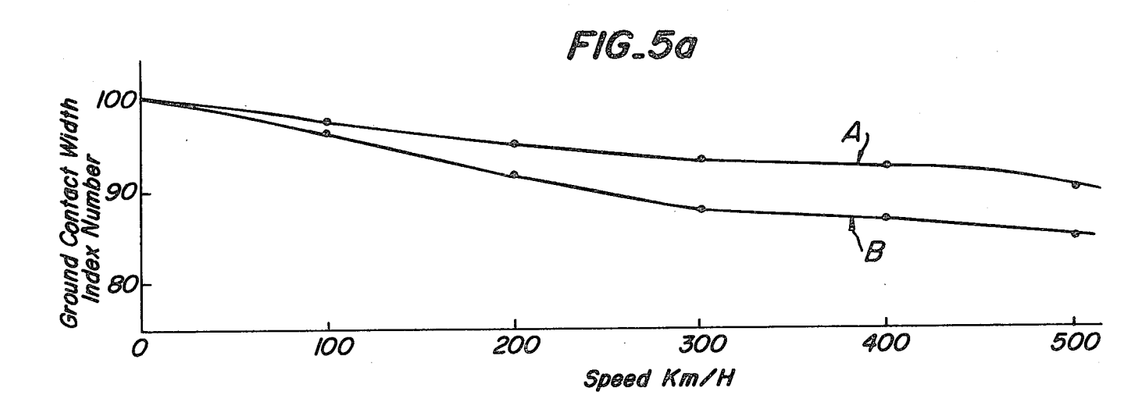
FIG. 5a is a graph showing a relation between a ground contact width and a speed of a tire according to the invention as compared with the corresponding relation of a conventional tire.

In FIG. 5a is shown a relation between the ground contact width which is causally dependent on the decrease of crown radius and the speed of the tire according to the invention (curve A) as compared with the corresponding relation of the conventional tire (curve B). The index number of the ground contact width when the speed is zero is taken as 100.

Figure 5B:
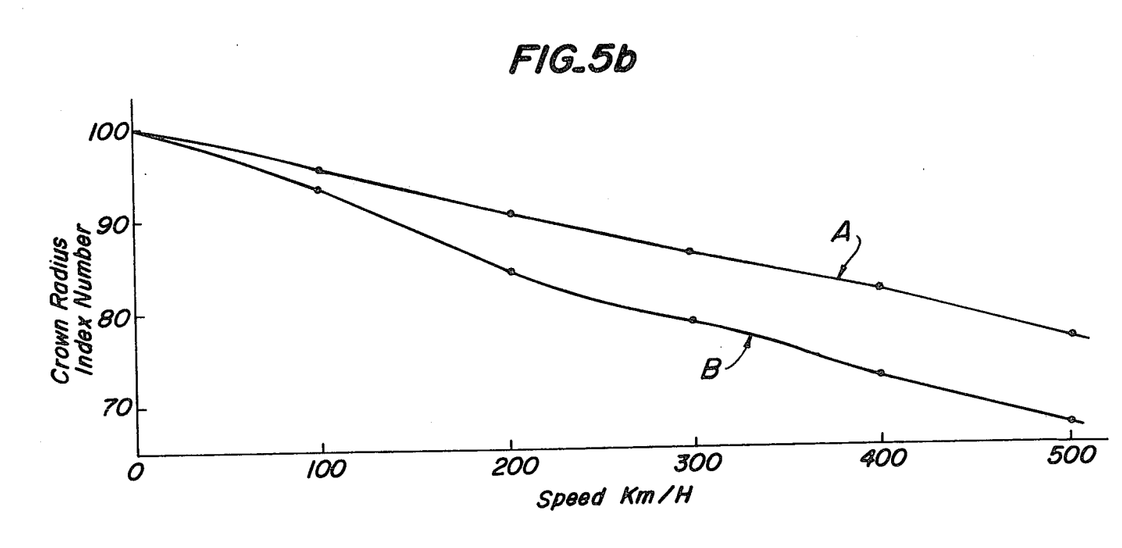
FIG. 5b is a graph showing a relation between a crown radius and a speed of a tire according to the invention as compared with the corresponding relation of a conventional tire.

In FIG. 5b is shown a relation between the corresponding crown radius of curvature and the speed of the tire according to the invention (curve A) as compared with the corresponding relation of the conventional tire (curve B). The index number of the crown radius when the speed is zero is taken as 100.

The curves A and B shown in FIGS. 5a and 5b are based on date obtained from experimental tests on the tire according to the invention and the conventional tire under conditions that the maximum load of 3,000 kg, L=0.08, maximum speed of 500 km/h and G=6150.

Figure 5C:
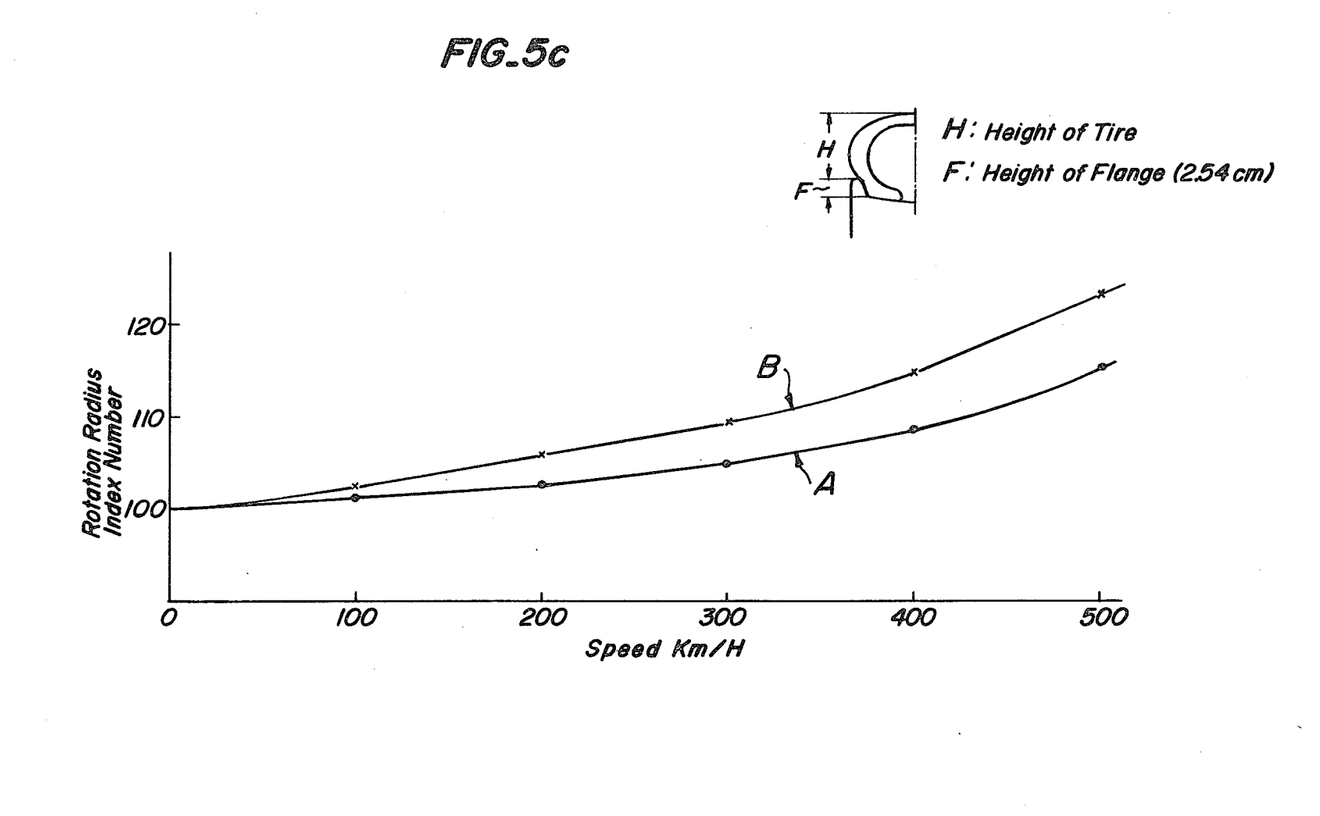
FIG. 5c is a graph showing a relation between a rotation radius and a speed of a tire according to the invention as compared with the corresponding relation of a conventional tire.

In FIG. 5c is shown a graph illustrating a relation between a rotation radius and a speed of the tire according to the invention (curve A) as compared with the corresponding relation of the conventional tire (Curve B). The curves A, B shown in FIG. 5c are based on data obtained from experimental tests on the tire according to the invention and the conventional tire by measuring change of the height of tire H on the basis that index number of the height of tire is taken as 100 when the speed is zero under load, the tire being united with a rim having a flange whose height F=2.54 cm as shown in FIG. 5c.

As shown in FIG. 5a, the invention is capable of making the ground contact width at the speed of 500 km/h, for example, 12.5% larger than the ground contact width of the conventional tire, while the ground contact width of the tire according to the invention at low and medium speeds between 0 and 200 km/h is not much different from that of the conventional tire. As a result, the invention can significantly alleviate the decrease of the ground contact width of the tire when it rotates particularly at an extra high speed. In addition, as seen from FIG. 5b, the invention can considerably restrain the crown radius from decreasing from a speed of at least approximately 200 km/h.

As stated hereinbefore, the invention is capable of providing a pneumatic tire which has a sufficiently large load-bearing ability at a high speed under a heavy load and can efficiently restrain the crown radius exerting various influences upon the tire performance when the tire rotates at a high speed from decreasing.

What is claimed is:

1. A pneumatic tire for high speed under a heavy load comprising; a casing reinforcing layer composed of a plurality of carcass plies mainly formed of organic textile cords inclined at an angle of at most 45° to the circumferential direction of the tire, said carcass plies extending from one bead portion of the tire through a crown portion of the tire to the other bead portion and superimposed one upon the other, and a plurality of reinforcing fabrics whose material and inclined angle to the circumferential direction of the tire are substantially the same as those of said cords of the carcass ply and interposed between said carcass plies, said plurality of reinforcing fabrics extending from those positions which are distant apart from one of the bead portions through the tire crown portion and terminating at those positions which are distant apart from the other bead portion, the number of said reinforcing fabrics being at least 20% of the total number of both said carcass plies and said reinforcing fabrics of said casing reinforcing layer, the total number of carcass plies and reinforcing fabrics of said casing reinforcing layer being divided into two halves and one of said two halves crossing the other half, said reinforcing fabrics gradually changing in width within a range between 35% and 60% of the inner peripheral length of the tire and symmetrically arranged with respect to the crown center portion, the superimposed thickness of said casing reinforcing layer being uniformly and continuously decreased such that the thickness at a hump portion is within a range between 85% and 95% of the thickness at the crown center portion thereof and the thickness at a side wall portion is within a range between 50% and 75% of the thickness at the crown center portion thereof, the thickness of a tread coating rubber surrounding said casing reinforcing layer being gradually increased from the crown center portion toward the hump portions such that the thickness at the crown center portion is 10 to 28% of the total thickness of the crown center portion and is at most 1.5% of the maximum outer diameter of the tire when it is inflated, and said tire having such a high rigidity as defined by cross-sectional area ratios given by $V_2/V_1 = 0.45$ to $0.60$ and $V_3/V_2 = 0.6$ to $0.8$ where $V_1$ is a total cross-sectional area surrounded by the outer contour of the tire and a flat base rim, $V_2$ is a substantial cross-sectional area surrounded by the outer and inner contours of the tire and $V_3$ is a cross-sectional area of said case reinforcing layer inclusive of bead cores, wherein a decrease of the radius of curvature at the crown portion induced when the tire is rotated on the ground at a high speed under a heavy load is primarily alleviated by a deformation of said side wall portion.

2. The pneumatic tire according to claim 1, wherein the number of said reinforcing fabrics is 25 to 40% of the total number of both said carcass plies and said reinforcing fabrics of said casing reinforcing layer.

3. The pneumatic tire according to claim 1 or 2, wherein the width of said reinforcing fabrics is gradually changed within a range between 45% and 60% of the inner peripheral length of the tire.

4. The pneumatic tire according to claim 1 or 2, wherein the thickness of said superimposed thickness of said casing reinforcing layer at said hump portion is within a range between 88% and 93% of the thickness at the crown center portion of the tire and at said side wall portion is within a range between 50% and 70% of the thickness at the crown center portion of the tire.

5. The pneumatic tire according to claim 1, wherein the thickness of said tread coating rubber at the crown center portion is 15 to 25% of the total thickness of said crown center portion, $V_2/V_1 = 0.48$ to $0.57$ and $V_3/V_2 = 0.65$ to $0.75$.

6. The pneumatic tire according to claim 1, wherein the width of said reinforcing fabric located near the tread coating rubber is made smaller than the width of the other reinforcing fabrics.

7. The pneumatic tire according to claim 1, wherein the thickness of said casing reinforcing layer at the crown center portion is within a range between 70% and 90%, preferably 75% and 85% of the total thickness of the crown center portion of the tire.

8. The pneumatic tire according to claim 1, wherein said bead portions comprise inner and outer bead cores, said carcass plies being divided into two sets of plies, one of said sets of plies wrapped around said inner bead core from an inside direction to an outside direction and the other set of plies wrapped around said outer bead core from an inside direction to an outside direction.

* * * * *